Dec. 18, 1951 G. M. GIBSON Re. 23,441

DISAPPEARING WRINGER WASHING MACHINE

Original Filed March 24, 1947 3 Sheets-Sheet 1

Inventor
George M. Gibson
By: Charles K. Worsham
Agent.

Dec. 18, 1951 G. M. GIBSON Re. 23,441

DISAPPEARING WRINGER WASHING MACHINE

Original Filed March 24, 1947 3 Sheets-Sheet 2

Inventor:
George M. Gibson

By: Charles K. Woodin
Agent.

Dec. 18, 1951 G. M. GIBSON Re. 23,441

DISAPPEARING WRINGER WASHING MACHINE

Original Filed March 24, 1947 3 Sheets-Sheet 3

Inventor:
George M. Gibson

By: Charles K. Woodin
Agent.

Reissued Dec. 18, 1951

Re. 23,441

UNITED STATES PATENT OFFICE 23,441

DISAPPEARING WRINGER WASHING MACHINE

George M. Gibson, Bellevue, Iowa, assignor to Reconstruction Finance Corporation, Chicago, Ill., a corporation of the United States Original No. 2,493,916, dated January 10, 1950, Serial No. 736,745, March 24, 1947. Application for reissue May 17, 1950, Serial No. 164,809

7 Claims. (Cl. 68—245)

Matter enclosed in heavy brackets [ ] appears in the original patent but forms no part of this reissue specification; matter printed in italics indicates the additions made by reissue.

This invention relates to a wringer which is designed for use in connection with clothes washing machines and more particularly with a small type household utility model capable of being stored in relatively small quarters while not in use. In this connection, the wringer is so constructed and mounted as to provide a disappearing wringer capable of moving about its mountings on the washing machine tub so that the wringer may be turned over into the tub proper of the machine whereby the overall dimensions of the washing machine are directly determined by the overall dimensions of the tub of the machine itself.

It is one of the main objects of the present washing machine and the disappearing wringer structure to provide such a wringer which is capable of moving into and out of the tub proper of the washing machine and wherein the wringer is so constructed as to provide a portion of the closure of the upper end of the washing machine tub when disposed in operative position and also when disposed within the tub and out of operative wringing position.

Another object of the present invention is to provide a cover for the wash*ing* machine which cooperates with the wringer and tub to form a closure means for covering the remainder of the open tub portion when the wringer is disposed in inoperative position within the tub[e], and such cover also provides the closure means between the wringer portion of the top of the tub enclosing the balance of the opening when the wringer is disposed in operative wringing position above the upper peripheral edges of the tub walls. This cooperative cover means also provides a tray which can be displaced from the tub closing position to a position adjacent the clothes discharging side of the wringer where it is operatively retained by cooperative means formed on the wringer while the tray rests upon the upper edge of the one of the tub walls to extend outwardly from the tub proper thus forming a removable tray which receives the clothes as the latter are expelled from the wringer.

Another object of the present invention is to provide the simplified wringer structure with suitable latch means which will automatically hold the wringer in raised and operative relation with respect to the tub of the washing machine when the latch means is manually operated. As an additional feature, the base of the wringer itself is arranged and designed to support such latch means in a position to coact with a portion of the washing machine tub with a portion of the base of the wringer automatically engaging a portion of the tub whenever the wringer is disposed out of operative position and within the tub positioning the wringer in inverted and housed relation. When the wringer is so inverted and so held, the base portion thereof forms a part of the closure means of the tub per se.

A further object of the present invention is to provide a manually operable handle for rotating the wringer rolls which is connected with the shaft of the drive roll in such a manner [so] that it may be released, rotated and folded into a position alongside of the wringer rolls so that this handle will also be capable of movement into the tub together with the wringer whenever the latter is being inverted and nested within the walls of the tub proper of the washing machine.

All other objects and advantages inherently relating to the particular design and construction of the washing machine with the feature of the disappearing wringer shall hereinafter appear in the following detailed description relating to a preferred embodiment thereof and referring directly to the drawings disclosing such embodiment and forming a part of this specification.

Figure 2:
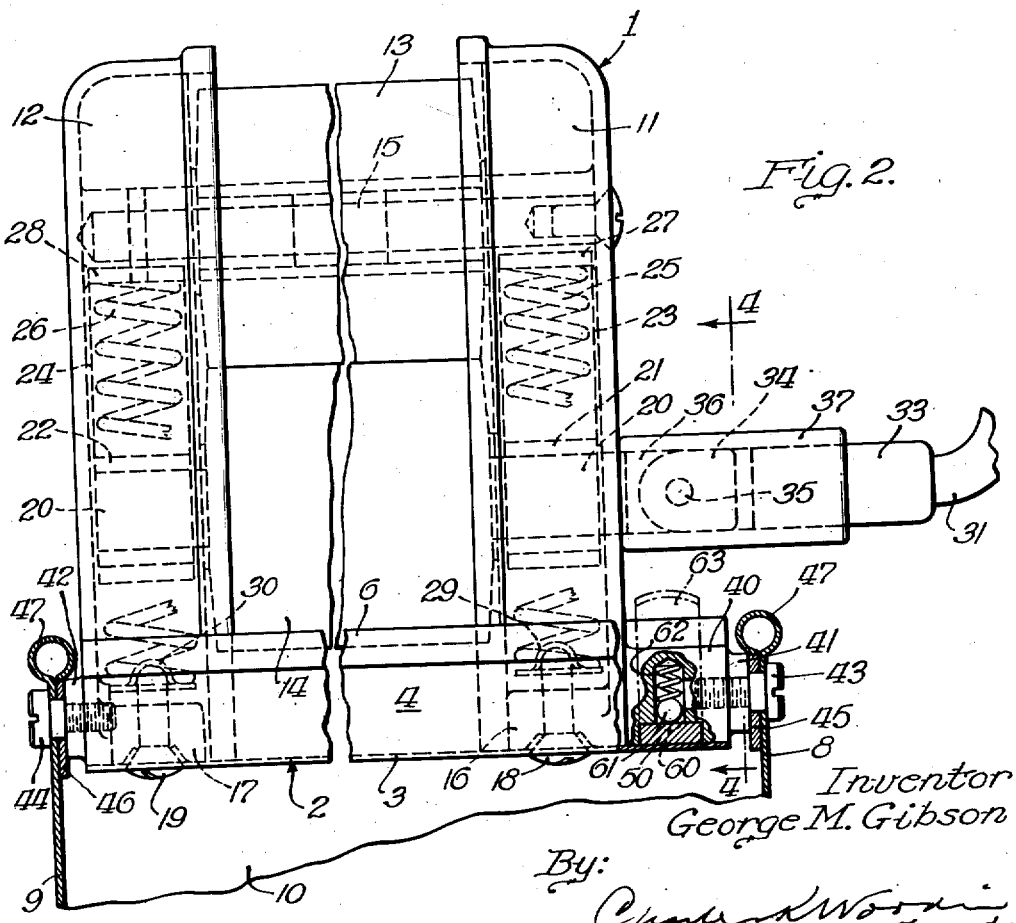
Fig. 2 is an enlarged side elevational view of the wringer structure as mounted upon a fragmentary portion of the tub with certain portions thereof broken away and in section to better emphasize the details of the combined wringer and washer.
Figure 4:
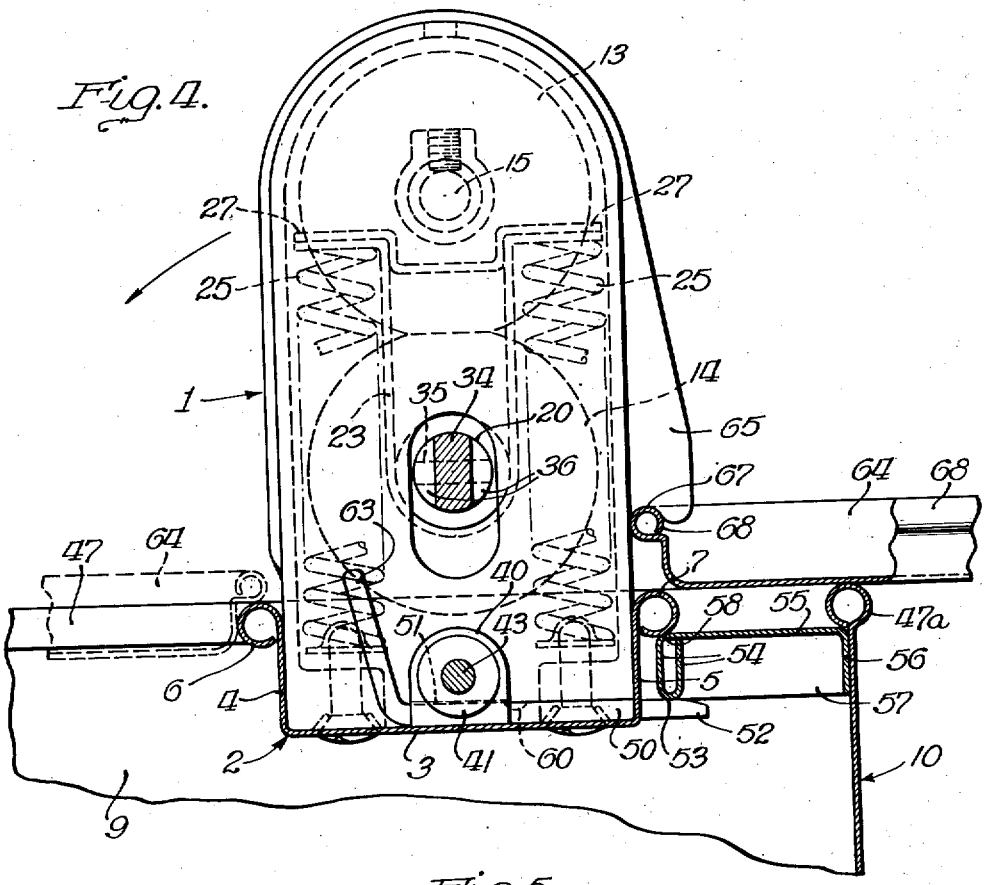
Figure 5:
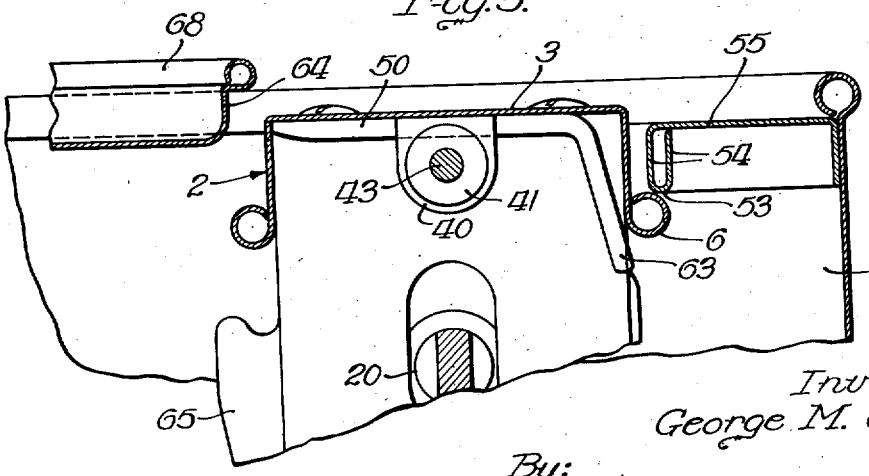

Fig. 4 is an end elevational view of the wringer structure and washer combination with certain portions thereof in section substantially as viewed along the line 4—4 in Fig. 2; and Fig. 5 illustrates a fragmentary portion of Fig. 4 with the wringer rotated into nested and inoperative position within the upper portion of the washer tub and with the tray being removed and replaced to provide a cover for the open portion of the tub when the wringer is in the position shown.

Any type of clothes wringer may be utilized in combination with the tub of a washing machine in carrying out the inherent principles of the present invention. The wringer in the construction disclosed is generally indicated at 1 and is conveniently secured and supported by a base 2, such base providing a flat under surface 3 having upstanding flanges 4 and 5 which terminate in beaded edges 6 and 7, respectively. In this manner, the base 2 constitutes a longitudinal trough extending the length of the wringer structure and substantially from wall to wall in the tub to provide a spillway for the water and suds which are pressed out of the clothes that pass through the wringer thereby causing such water to be directed and discharged adjacent the walls 8 and 9 of the washing machine tub 10 as seen in Fig. 2.

The disclosed wringer comprises in general a pair of end castings 11 and 12 supporting an upper roll 13 and a coacting lower roll 14 which extend between the castings 11 and 12 of the wringer. The upper roll 13 is journalled upon a fixed shaft 15 which also stabilizes the ends 11 and 12 of the wringer, and such ends are also secured by means of lugs 16 and 17, and the screws 18 and 19 to the trough base 2 which stabilizes and joins the lower portions of the castings 11 and 12.

The lower roll 14 is provided with a shaft 20 rotating in the bushings 21 and 22, respectively, which are carried in the cradles 23 and 24. Such cradles 23 and 24 are [each] carried upon the springs 25 and 26, respectively, which springs are confined between the laterally extending ears 27 and 28 of the cradles and the spring seats 29 and 30 supported upon the tips of the fastening screws 18 and 19.

With this particular arrangement, the lower roll 14 is at all times urged against the upper roll 13 while permitting roll 14 to move toward and away from the roll 13 during operation while articles of clothing are passing between the wringer rolls.

Figure 1:
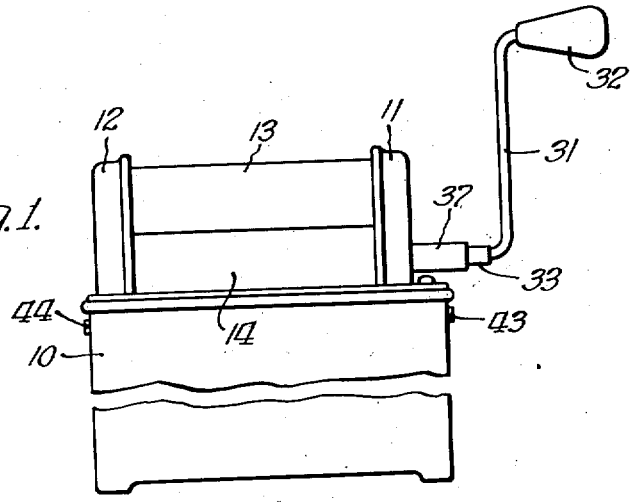
Fig. 1 is a side elevational view of the washing machine and hand wringer combination embodying the principal features set forth by the present invention.

The manually operable means for operating the wringer comprises a crank 31 having a suitable handle 32 designed for hand or fingertip operation, such crank 31 terminating at the wringer end with a stub shaft 33 having a tongue 34 which is pivotally connected by means of the pin 35 to the bifurcated end 36 of the drive shaft 20 that rotates the roll 14. Stub shaft 33 is held in operative driving alignment with the axis of shaft 20 by means of a locking sleeve 37 which is endwise shiftable to permit the folding of the crank about the pivot 35 and into a position alongside the wringer structure whenever the latter is moved into the tub 10 and into inoperative position as indicated in Fig. 5. Normally, the sleeve 37 is in the position indicated in the Figs. 1, 2 and 3 and such sleeve is of sufficient tightness to be frictionally maintained in its operative locking position wherein it prevents relative movement between the stub shaft 33 and the shaft 20 about the pivot 35 and in which position such sleeve disposes the crank 31 in operative wringing and roller driving relationship with respect to the wringer structure.

The wringer is pivotally supported adjacent the ends of the base portion thereof in the manner best illustrated in Fig. 2. The end casting 11 is provided with an extension 40 having a boss 41 disposed in direct alignment with a similar boss 42 formed on the end casting 12. A pair of pivot studs 43 and 44 pass through aligned openings in the walls 8 and 9 of the tub 10 and through suitable openings in the aligned bearing washers 45 and 46 and are secured in threaded bores disposed in aligned relationship in the bosses 41 and 42 of the end castings 11 and 12 of the wringer structure.

Figure 3:
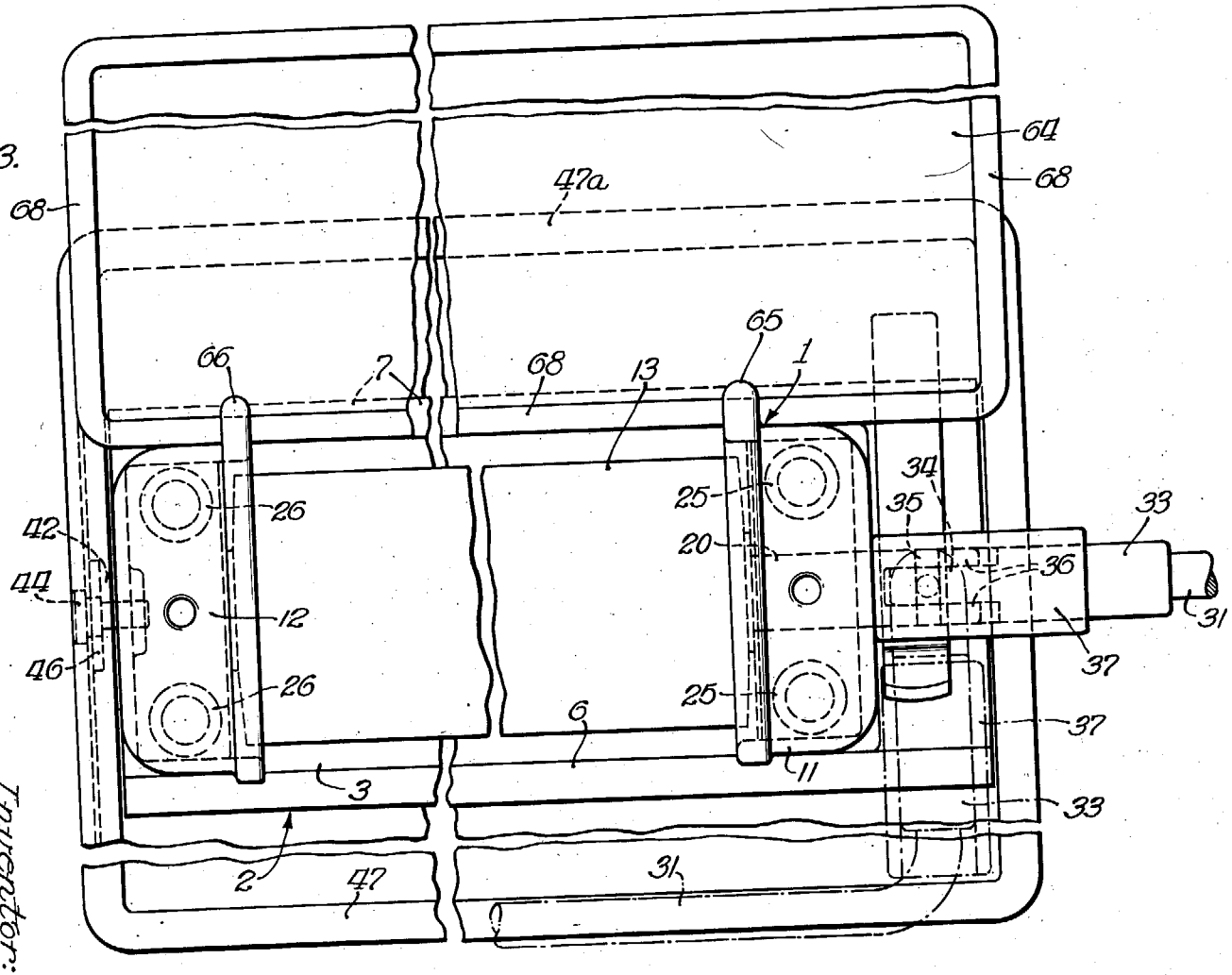
Fig. 3 is a plan view of the washer-wringer combination with the wringer in usable and operative position and showing the cover of the washer acting as a tray and in clothes receiving position adjacent the wringer.

The pivotal mountings described are disposed directly below the peripheral top bead 47 of the tub 10, and as shown in Figs. 2 and 3, the base trough of the wringer generally indicated at 2 terminates just short of the bead portions 47 of the walls 8 and 9 of the tub 10 to substantially close off this particular section of the upper end of the tub by means of the base trough of the wringer.

The wringer is normally held in the upright and operative position indicated in Figs. 1 to 4, inclusive, by means of a suitable latch which is best shown in Figs. 2, 3 and 4 and comprises a sliding bar 50 supported for endwise movement through a suitable opening 51 formed in the projection 40 of the end casting 11, such a bar having a tapered or wedge end 52 capable of locking engagement with the lower edge 53 of the depending flange 54 which forms an integral portion of the shelf 55 that is suitably secured to the walls of the wash*ing* machine tub 10 by the flanges 56 and 57 through spot welding or by other fastening means. As shown in Fig. 4, the bead 7 of the wringer base 2 is of a size and is so disposed and arranged to abut the upper surface portion 58 of the shelf 55 thereby locking the wringer 1 in fixed and upright operative position for use during the wringing operation in coaction with the sliding bar 50.

As further illustrated in Fig. 2, the lock bar 50 is provided with a depression 60 which coacts with a spring pressed ball 61 carried in a suitable bore 62 whenever the latch bar 50 is pulled by means of its handle 63 into the retracted position indicated in Fig. 5 holding such latch bar in this position by means of the ball 61 engaging within the recess 60 in the latch bar. A second depression like 60 may be provided in the bar to hold the same in its locking [engagement] *position* as shown in Figs. 3 and 4 although it is better to depend upon the tapered surface of the end 52 for frictionally retaining the bar in its operative position and to rely on the wedge portion of this lock bar to tightly clamp the wringer structure by means of the bead 7 and the bar over the top and bottom edges of the flange 54 of the shelf 55.

A cover 64 in the form of a tray provides the final closure means for the top of the wash*ing* machine tub 10 in addition to the wringer base 2 and the shelf 55 and this cover is disposed as shown in dotted lines in Fig. 4 during the washing operation. The shelf 55 is a means to place the wringer slightly inwardly from the adjacent tub wall. After the washing operation has been completed, this cover 64 can be transferred to the opposite side of the wringer as shown in full lines in Fig. 4 to provide a clothes receiving tray for the articles of clothing that are passed from the tub 10 through the wringer 1 in the direction of the tray as described.

To accommodate the tray or cover 64 in clothes receiving position, as indicated in full lines in Fig. 4, the wringer end castings 11 and 12 are provided with projections 65 and 66 having recesses such as 67 to form hooks to accommodate the head 68 of the cover tray 64 while a portion of the tray overhanging the washing tub 10 rests upon the top of the peripheral bead 47a of the tub 10 securely supporting the tray 64 in cantilever relation adjacent the wringer and in position projecting over the edge of the tub as clearly illustrated in Figs. 3 and 4.

After the wash day chores have been completed, the wringer may be rotated into the 180° position indicated in Fig. 5 by release of the latch bar 50 bringing the portion 3 of the base into horizontal alignment substantially adjacent the shelf 55 with bead 6 of the trough base engaging the edge 53 of the flange 54 of the described shelf 55. The tray 64 may then be placed substantially as shown in full lines in Fig. 5 to close up the upper end of the tub so that the three units comprising shelf 55, the base portion 3 of the wringer, and the cover 64 will completely close up the upper end of the wash*ing* machine tub 10. This rotation of the wringer into the inoperative and nested position within the tub 10 is also made possible by the construction of the crank 31 and the pivotal mechanism controlled by the slidable locking sleeve 37 together with the necessary clearance provided at the right hand end of the wringer as shown in Figs. 2 and 3 by means of the extension or projection 40 that permits the crank 31 to be rotated into the position indicated in dot and dash lines in Fig. 3. In this position the shaft 20 has been moved so that the pin 35 will be vertically disposed while the stub shaft 33 is then revolved 90° with respect to the operative axial position of the wringer shaft 20 bringing the crank 31 adjacent the side of the wringer rolls with the handle 32 obviously extending away from the rolls and into a position providing sufficient clearance to rotate the wringer into the tub for storing purposes whenever the washing machine is not in use. Other possible relationships of the folding handle are also possible in providing the means explained for permitting the wringer to rotate from the Fig. 4 position into the Fig. 5 position or vice versa.

Consideration of Fig. 4 will indicate that the cover is adapted to rest upon the upper end of the tub and a portion of said wringer to close off the remaining portion of the washing machine tub. When the wringer is in operation, the cover is adapted to rest upon the upper end of the tub under hook projections on the wringer so that the cover may be used as a tray to receive articles of clothing discharged from the wringer when the wringer is in operation. When the wringer is rotated within the tub as indicated by the arrow around the pivot 43, the bottom of the wringer is supported in horizontal position as the wringer is rotated in the horizontal position by abutment of the bead 6 against the projection 53 which limits the rotation of the wringer in the horizontal position. From the above descriptions it will be appreciated that I have produced an inexpensive arrangement which adds considerable utility to the combination.

Changes in the exact form, design and construction as well as in the combination of elements are contemplated, but such changes shall be controlled by the language of the appended claims defining this invention.

What I claim is:

1. The combination with a wash*ing* machine tub, of a wringer having a flat bottomed base extending between opposite walls of said tub, pivotal means connected with said walls and supporting the opposite ends of said wringer for movement about an axis to either dispose the wringer in stored relation within said tub or out of the top thereof in operative position, said flat bottomed base providing a closure for the portion of the tub supporting said wringer while in either of its two positions, and cover means coacting with said tub and said wringer to close the remaining portion of the wash*ing* machine tub.

2. The combination with a wash*ing* machine tub, of a wringer having a flat bottomed base extending between opposite walls of said tub, pivotal means connected with said walls and supporting the opposite ends of said wringer for movement about an axis to either dispose the wringer in stored relation within said tub or out of the top thereof in operative position, said flat bottomed base providing a closure for the portion of the tub supporting said wringer while in either of its two positions, and a cover adapted to rest upon the upper end of the tub and upon a portion of said wringer to close off the remaining portion of the wash*ing* machine tub, said wringer having hook projections thereon pointing downwardly when said wringer is up and in operative position, and said cover being arranged to form a tray capable of having one edge portion thereof engage underneath said hook projections with another portion of said tray resting upon the adjacent edge of said tub with the tray overhanging the latter to receive articles of clothing discharged from the wringer while the latter is in operation.

3. The combination with a wash*ing* machine tub, of a wringer having a continuous flat bottomed base extending between opposite walls of said tub, pivotal means at the ends of said wringer to support same for rotative movement into or out of said tub, said flat bottomed base being arranged to form partial closure means for the open top of said tub when the wringer is in either of its positions, a cover adapted to coact with the open end of said tub and the wringer to close the remaining open potrion of said tub, removal of said cover permitting rotation of said wringer, and abutment means on said wringer base adapted to engage a portion of said tub to limit the rotation of said wringer into either of its two positions.

4. *The combination with a washing tub having upstanding surrounding walls, of a wringer having supporting structure and wringer means carried thereby, means pivotally carrying the wringer on opposite walls of the tub and spaced from an adjacent interconnecting side wall whereby said wringer may be swung from raised operative position with respect to the tub to a lowered position within said tub, said wringer structure having at least one wall portion arranged to form a partial closure across the washing tub when said wringer is lowered to inoperative position, and means forming a horizontal shelf over the washing tub extending between said opposite walls and from said interconnected wall substantially to the wringer, said shelf coacting with said one wall portion of the wringer structure to form a closure for said tub when the wringer is in inoperative position.*

5. *The combination with a washing tub having upstanding surrounding walls, of a wringer having supporting structure and wringer means carried thereby, means pivotally supporting the wringer on opposite walls of the tub for swinging movement to an upright operative position, a cover for said tub at one side of said wringer and removably arranged to allow swinging of said wringer, a fixed cover portion on said tub at the opposite side of the wringer, and a latch movably mounted*

*on the wringer in position to engage a portion of said fixed cover on said tub for holding the wringer in the upright operative position.*

*6. The combination with a washing tub having upstanding surrounding walls, of a wringer having supporting structure and wringer means carried thereby, means pivotally supporting the wringer on opposite walls of the tub to swingably support said wringer between vertically upright and vertically depending positions, said wringer having a solid walled base, a fixed tub cover at one side of said wringer base, a removable tub cover at the opposite side of said wringer base to allow swinging of the wringer, and said pivot means including bosses fixed at opposite ends of the wringer base and centrally thereof, and pivot studs connected with said opposite tub walls on a median plane between said tub covers and extending into the bosses, said wringer base providing cover means to close the space between said tub covers when said wringer is swung into vertical depending position.*

*7. The combination with a washing tub having upstanding surrounding walls and having a top opening, of a wringer having supporting structure and wringer means carried thereby, means pivotally supporting the wringer so that the wringer means is over the top opening of the tub and to permit the wringer to swing into the tub for storage purposes, a cover to enclose the open portion of the top of the tub adjacent the wringer, said wringer having a wall portion thereon to coact with said cover to form a continued enclosure for said tub when said wringer*

*is swung into the tub, said cover being removable to permit swinging of said wringer, a crank handle on said wringer arranged to normally rotate in a plane disposed outwardly of the tub periphery when said wringer is disposed in operative position, said handle being hingedly mounted on the wringer to permit the handle to be folded against the wringer when the latter is being swung into stored position below the plane of the tub cover structure.*

GEORGE M. GIBSON.

REFERENCES CITED

The following references are of record in the file of this patent or the original patent:

UNITED STATES PATENTS

| Number | Name | Date |
|---|---|---|
| 379,935 | Clementsen | Mar. 27, 1888 |
| 1,053,379 | Glasener | Feb. 18, 1913 |
| 1,358,763 | Longworth | Nov. 16, 1920 |
| 1,524,390 | Dil | Jan. 27, 1925 |
| 1,972,778 | Kennett | Sept. 4, 1934 |

FOREIGN PATENTS

| Number | Country | Date |
|---|---|---|
| 36,054 | Austria | Jan. 25, 1909 |
| 1,808 | Great Britain | of 1906 |
| 6,575 | Great Britain | of 1912 |
| 315,150 | Great Britain | July 11, 1929 |
| 383,695 | Great Britain | Nov. 24, 1932 |
| 389,488 | Great Britain | Nov. 15, 1933 |
| 402,715 | Great Britain | Dec. 7, 1933 |
| 402,936 | Great Britain | Dec. 14, 1933 |